United States Patent
Bustos et al.

(10) Patent No.: US 8,162,056 B2
(45) Date of Patent: *Apr. 24, 2012

(54) APPLICATION OF DEGRADABLE FIBERS IN INVERT EMULSION FLUIDS FOR KILL PILLS

(75) Inventors: Oscar Bustos, Katy, TX (US); Syed Ali, Sugar Land, TX (US); Chau Nguyen, Houston, TX (US)

(73) Assignees: Schlumberger Technology Corporation, Sugar Land, TX (US); M-I L.L.C., Houston, TX (US)

( * ) Notice: Subject to any disclaimer, the term of this patent is extended or adjusted under 35 U.S.C. 154(b) by 309 days.

This patent is subject to a terminal disclaimer.

(21) Appl. No.: 12/486,585

(22) Filed: Jun. 17, 2009

(65) Prior Publication Data

US 2010/0319919 A1 Dec. 23, 2010

(51) Int. Cl.
 *E21B 33/138* (2006.01)
 *E21B 43/28* (2006.01)
(52) U.S. Cl. ......... 166/293; 166/279; 166/300; 166/304
(58) Field of Classification Search .................... None
See application file for complete search history.

(56) References Cited

U.S. PATENT DOCUMENTS

| | | | |
|---|---|---|---|
| 4,387,769 A | 6/1983 | Erbstoesser et al. | |
| 4,526,695 A | 7/1985 | Erbstoesser et al. | |
| 7,066,260 B2 | 6/2006 | Sullivan et al. | |
| 2001/0051593 A1 | 12/2001 | Patel | |
| 2005/0059557 A1 | 3/2005 | Todd et al. | |
| 2008/0194433 A1 | 8/2008 | Tehrani | |
| 2008/0200354 A1* | 8/2008 | Jones et al. | 507/244 |
| 2009/0139723 A1* | 6/2009 | Pirolli et al. | 166/312 |
| 2010/0212896 A1* | 8/2010 | Navarro et al. | 166/278 |

FOREIGN PATENT DOCUMENTS

WO 03064556 A1 8/2003

* cited by examiner

*Primary Examiner* — Zakiya W Bates
(74) *Attorney, Agent, or Firm* — Robin Nava; Daryl Wright; Jeremy Tillman

(57) ABSTRACT

A method of treating a subterranean formation includes pumping into a cased, perforated wellbore that intersects the formation an invert emulsion kill fluid, the invert emulsion kill fluid comprising: an oleaginous continuous phase; a non-oleaginous discontinuous phase; an emulsifier; at least one degradable material; and at least one bridging material; contacting the formation with the kill fluid; and allowing the degradable material to at least partially degrade.

25 Claims, 2 Drawing Sheets

APPLICATION OF DEGRADABLE FIBERS IN INVERT EMULSION FLUIDS FOR KILL PILLS

BACKGROUND OF INVENTION

1. Field of the Invention

Embodiments disclosed herein relate generally to kill fluids used in the completion of oil and gas wells.

2. Background Art

Kill fluids are commonly placed in a wellbore during oil field wellbore operations, such as wellbore completions, to kill the well, i.e., prevent the influx of formation fluids into the wellbore and the loss of wellbore fluids to the formation while the well is open. The kill fluid is often maintained in the wellbore for the entire duration of the operation.

Conventional kill fluids known in the art are typically aqueous liquids, which contain a weighting agent, such as inert inorganic solids in solution or suspension, to increase the density of the fluid. The weighted kill fluid applies a hydrostatic pressure against the formation fluid, which is greater than the pressure exerted by the formation fluid attempting to intrude into the wellbore. This overbalanced hydrostatic pressure prevents the ingress of formation fluids into the wellbore during performance of the given oil field wellbore operation, which is necessary from an operational standpoint to prevent interference from formation fluids, as well as from a safety standpoint to prevent blowouts and well kicks.

Thickeners are often included in weighted kill fluids to provide for leakoff inhibition. Fluid leakoff can undesirably result in formation damage, i.e., permeability reduction, resulting in reduced hydrocarbon recovery or reduced injectivity into the formation.

In particular, advantageous kill fluids are those that not only prevent formation fluid influx into the wellbore, but also prevent appreciable wellbore fluid leakoff into the formation. Kill fluids achieve their fluid loss control from the presence of specific solids that rely on filtercake build up on the face of the formation to inhibit flow into and through the formation. However, these additive materials can cause severe damage to near-wellbore areas of the formation after their application. This damage can significantly reduce production levels if the formation permeability is not restored to its original level. Further, at a suitable point in the completion operation, the filter cake must be removed to restore the formation's permeability, preferably to its original level.

After any completion operations have been accomplished, removal of filter cake formed from the kill fluid remaining on the sidewalls of the wellbore may be necessary. Although a kill fluid may be essential to completion operations, the barriers can be a significant impediment to the production of hydrocarbon or other fluids from the well if, for example, the rock formation is still plugged by the barrier. Because filter cake is compact, it often adheres strongly to the formation and may not be readily or completely flushed out of the formation by fluid action alone.

Accordingly, there exists a need for a kill fluid that may effectively reduce the ingress and egress of fluids between the formation and wellbore during a completion operation but also minimizes formation damage.

SUMMARY OF INVENTION

In one aspect, embodiments disclosed herein relate to a method of treating a subterranean formation that includes pumping into a cased, perforated wellbore that intersects the formation an invert emulsion kill fluid, the invert emulsion kill fluid comprising: an oleaginous continuous phase; a non-oleaginous discontinuous phase; an emulsifier; at least one degradable material; and at least one bridging material; contacting the formation with the kill fluid; and allowing the degradable material to at least partially degrade.

In another aspect, embodiments disclosed herein relate to a method that includes forming an invert emulsion kill fluid, the invert emulsion kill fluid comprising: an oleaginous continuous phase; a non-oleaginous discontinuous phase; an emulsifier; at least one degradable material; and at least one bridging material; pumping the kill fluid into a cased, perforated wellbore that intersects a subterranean formation; forming a filtercake; and breaking the filtercake by allowing the degradable material to degrade.

In yet another aspect, embodiments disclosed herein relate to a method that includes forming an invert emulsion kill fluid comprising: an oleaginous continuous phase; a non-oleaginous discontinuous phase; an emulsifier; at least one degradable material; and at least one bridging material; emplacing the kill fluid into a cased, perforated wellbore; forming a filtercake; and breaking the filter cake, wherein hydrolysis of the degradable material breaks the filtercake.

Other aspects and advantages of the invention will be apparent from the following description and the appended claims.

DETAILED DESCRIPTION

Figure 1:
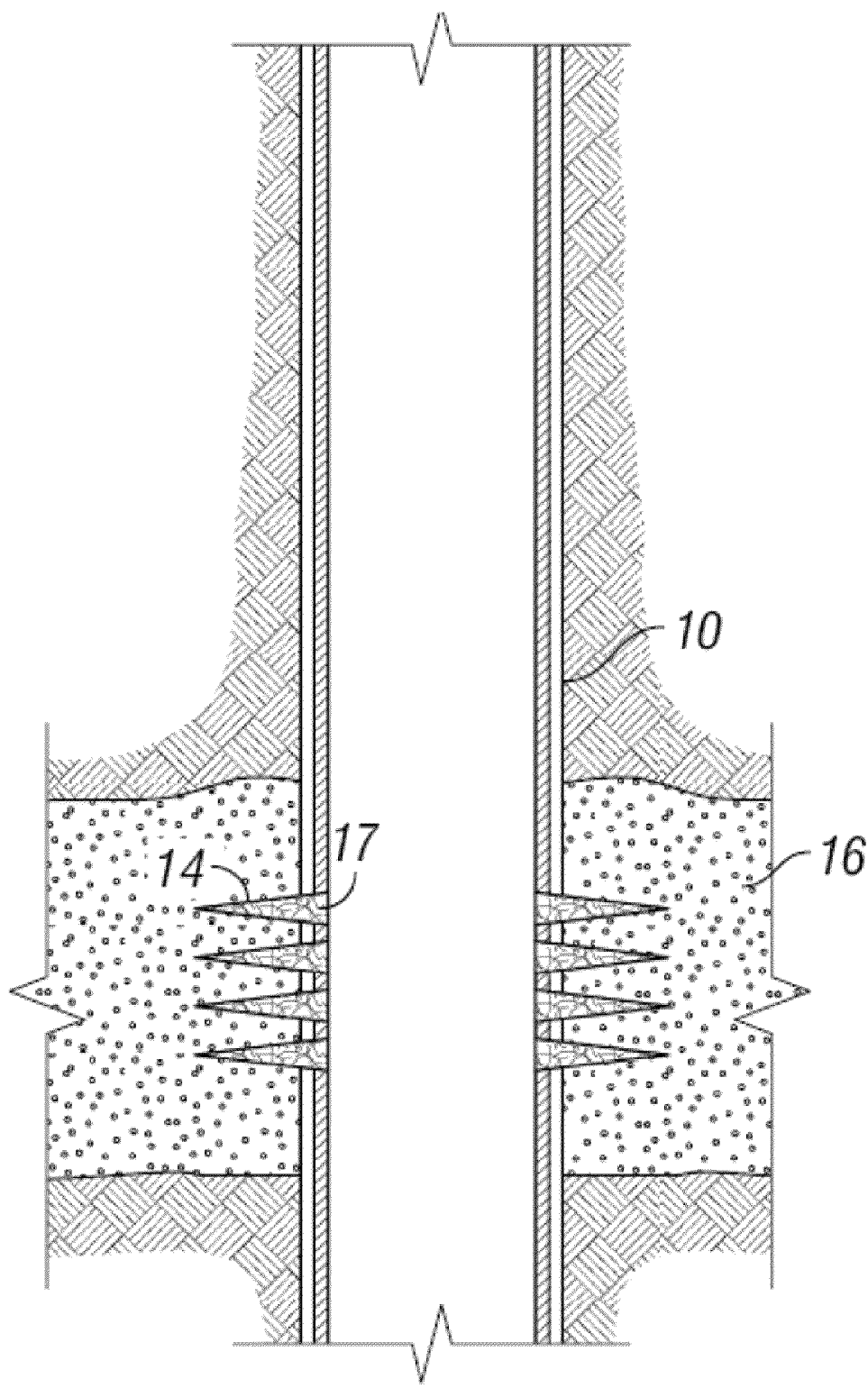
FIG. 1 is a schematic diagram of filtercake deposited in the perforation tunnels of a perforated casing after spotting a kill pill according to an embodiment of the present disclosure.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors have disclosed and enabled the entire range and all points within the range.

In one aspect, embodiments disclosed herein relate to kill fluid treatments used in completion operations to reduce or preventingress and egress of fluids between a formation and a cased, perforated wellbore. In particular, embodiments disclosed herein relate to invert emulsion kill fluids having degradable fibers and a bridging material therein that may effectively bridge and seal off (through formation of a filtercake) perforations formed in a production zone of a cased and perforated wellbore so that other completion operations may be performed. Because the fibers are degradable, the treatment may be temporary, allowing the filtercake to be easily broken and removed from the wellbore without or with minimal damage to the formation. Thus, the kill fluids of the present disclosure may include an oleaginous continuous phase, a non-oleaginous discontinuous phase, degradable fibers, a bridging agent, and at least one surfactant/emulsifier to stabilize the oleaginous and non-oleaginous phases as an invert emulsion. Each of the fluid components will be discussed in turn.

Degradable Materials

Degradable materials may include solid materials, such as fibers, that are soluble and hydrolyze in a base, such as solid cyclic dimers or solid polymers of certain organic acids that hydrolyze into soluble products readily in the presence of base. For example, such degradable fibers may be formed of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, or mixtures thereof.

Further examples of other degradable materials include those described in the publication of Advances in Polymer Science, vol. 157, "Degradable Aliphatic Polyesters," edited by A. C. Albertson (2001). Specific examples include homopolymers, random, block, graft, and star- and hyper-branched aliphatic polyesters. Polyesters can be prepared by, for example, polycondensation reactions, ring-opening polymerizations, free radical polymerizations, coordinative ring-opening polymerizations, and any other suitable process. Specific examples of suitable polymers include aliphatic polyesters; poly(lactides); poly(glycolides); poly(ε-caprolactones); poly(hydroxybutyrates); poly(anhydrides); aliphatic polycarbonates; poly(orthoesters); poly(amino acids); polyphosphazenes, and the like.

The above mentioned degradable materials may be comprised solely of polyester particles, e.g., the pill may be free or essentially free of non-polyester solids, or the polyester may alternatively be mixed or blended with other degradable or dissolvable solids, for example, solids that react with the hydrolysis products, such as magnesium hydroxide, magnesium carbonate, dolomite (magnesium calcium carbonate), calcium carbonate, aluminum hydroxide, calcium oxalate, calcium phosphate, aluminum metaphosphate, sodium zinc potassium polyphosphate glass, and sodium calcium magnesium polyphosphate glass. Moreover, examples of reactive solids that may be mixed include ground quartz (or silica flour), oil soluble resins, degradable rock salts, clays such as kaolinite, illite, chlorite, bentonite, or montmorillonite, zeolites such as chabazite, clinoptilolite, heulandite, or any synthetically available zeolite, or mixtures thereof. Degradable materials may also include waxes, oil soluble resins, and other materials that degrade or become soluble when contacted with hydrocarbons.

The degradable material may in the form of ribbons, platelets, fibers, flakes, or any other shape with an aspect ratio equal to or greater than one. The degradable materials may include particles having an aspect ratio greater than 10, greater than 100, greater than 200, greater than 250 or the like, such as platelets or fibers or the like. Further, the blended materials may take any form of composites, for example biodegradable material coatings or scaffolds with other materials dispersed therein. Further, the degradable particles may be nano-, micro-, or mesoporous structures that are fractal or non-fractal.

Exemplary fibers include, but are not limited to, polylactic acid polyester fibers, polyglycolic acid polyester fibers, polyvinyl alcohol fibers, and the like. Further exemplary fibers include polyester fibers coated to be highly hydrophilic, such as, but not limited to, DACRON™ polyethylene terephthalate (PET) fibers available from Invista Corp. Wichita, Kans., USA, 67220. When used in fluids of the present disclosure, the fiber component may be included at concentrations from about 5 to about 29 kg/m$^3$ of the liquid phase of the fluid, and more particularly, the concentration of fibers may be from about 11 to about 23 kg/m$^3$. However, one skilled in the art would appreciate that other amounts may be used.

Additional information related to relevant degradable materials may be obtained from U.S. Pat. Nos. 7,265,079, 7,350,573, and 7,066,260, which are incorporated by reference herein in their entirety.

Bridging Materials

Examples of bridging materials suitable for use in the present disclosure include calcium carbonate, dolomite (MgCO$_3$.CaCO3), barium sulfate (barite), ilmenite, hematite, olivine, siderite, galena, manganese oxide, iron oxides, strontium sulfate, celluloses, micas, proppant materials such as sands or ceramic particles and combinations thereof.

In order to achieve plugging or bridging of the perforation, a particulate treatment (particle type(s), particle geometry(s), concentration(s), and particle size distribution(s)) may be selected so that the bridging materials plug or bridge the mouth of the perforation and finer particles may then form a tight filtercake behind the bridging particles, thus forming a seal and fluid loss control. Particle sizes may also be selected so that that bridging material enters into and is deposited in the perforation by a process of dehydration as fluid phase of the kill fluid leaks-off into the formation. Further discussion of selection of particle sizes required to initiate a bridge may be found in SPE 58793, which is herein incorporated by reference in its entirety.

The concentration of the bridging material may vary depending, for example, the wellbore/formation in which the bridging materials are used, and in particular on the characteristics of the perforations, as well as the rate of fluid loss. However, the concentration should be at least great enough for the bridging material to bridge or plug the perforations in the wall of the wellbore, but should not be so high as to make placement of the fluid impractical.

The sizing of the bridging material may also be selected based on the size of the perforations in a given wellbore and/or the pore throat size of the formation. In one embodiment, the bridging material has an average particle diameter in the range of 50 to 1500 microns, and from 250 to 1000 microns in another embodiment. In other embodiments, however, particles having an average particles diameter of less than 50 microns may be used. For example, in particular embodiments, micronized particles having a $d_{90}$ ranging from 1 to 25 microns and a $d_{50}$ ranging from 0.5 to 10 microns, such as the particles described in U.S. Pat. Nos. 6,586,372, 7,267,291, and 7,449,431, and U.S. Patent Publication Nos. 2007/0184987, 2006/0188651, and 2005/0101492, which are herein incorporated by reference in their entirety, may be used. The expression $d_{90}$, and $d_{50}$ represent diameters of particles when the percentage by volume or by weight of particles of that diameter as compared to the total volume or weight of the sample is 90%, and 50%, respectively. It is also within the scope of the present disclosure that any of the bridging materials may optionally be coated with a dispersant material, similar to that described in U.S. Pat. Nos. 6,586,372, 7,267,291, and 7,449,431, and U.S. Patent Publication Nos. 2007/0184987, 2006/0188651, and 2005/0101492.

The bridging material may comprise substantially spherical particles; however, it is also envisaged that the bridging material may comprise elongate particles, for example, rods, flakes, sheets, or fibers. Where the bridging material comprises elongate particles, the average length of the elongate particles should be such that the elongate particles are capable of bridging or plugging the induced fractures at or near the mouth thereof. Typically, elongate particles may have an average length in the range 25 to 2000 microns, preferably 50 to 1500 microns, more preferably 250 to 1000 microns. The bridging material may be sized so as to readily form a bridge or plug at or near the mouth of the perforations. Further, in some embodiments, the bridging material may have a broad (polydisperse) particle size distribution; however, other distributions may alternatively be used.

Invert Emulsion

As discussed above, the kill fluids of the present disclosure may be invert emulsion, i.e., emulsions in which the non-oleaginous fluid is the discontinuous phase and the oleaginous fluid is the continuous phase.

The oleaginous fluid may be a liquid and more preferably is a natural or synthetic oil and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. The concentration of the oleaginous fluid should be sufficient so that an invert emulsion forms, and the concentration of the oleaginous fluid may be less than about 99% by volume of the invert emulsion. In one embodiment the amount of oleaginous fluid is from about 30% to about 95% by volume of the invert emulsion fluid and more preferably about 40% to about 90% by volume of the invert emulsion fluid. The oleaginous fluid in one embodiment may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein may be a liquid and preferably may be an aqueous liquid. More preferably, the non-oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. Thus in one embodiment the amount of non-oleaginous fluid is less that about 70% by volume of the invert emulsion fluid and preferably from about 1% to about 70% by volume of the invert emulsion fluid. In another embodiment, the non-oleaginous fluid is preferably from about 5% to about 60% by volume of the invert emulsion fluid.

Also typically included are emulsifiers and emulsifier systems for stabilizing the emulsion. As used herein, emulsifier, emulsifying agent, and surfactant are used interchangeably. The emulsifying agent serves to lower the interfacial tension of the liquids so that the non-oleaginous liquid may form a stable dispersion of fine droplets in the oleaginous liquid. A full description of such invert emulsions may be found in Composition and Properties of Drilling and Completion Fluids, 5th Edition, H. C. H. Darley, George R. Gray, Gulf Publishing Company, 1988, pp. 328-332, the contents of which are hereby incorporated by reference.

Emulsifiers that may be used in the fluids disclosed herein include, for example, fatty acids, soaps of fatty acids, amidoamines, polyamides, polyamines, oleate esters, such as sorbitan monoleate, sorbitan dioleate, imidazoline derivatives or alcohol derivatives and combinations or derivatives of the above. Additionally, the fluid may also contain surfactants that may be characterized as wetting agents. Wetting agents that may be suitable for use in the fluids disclosed herein include crude tall oil, oxidized crude tall oil, organic phosphate esters, modified imidazolines and amidoamines, alkyl aromatic sulfates and sulfonates, and the like, and combinations or derivatives of these. However, when used with the invert emulsion fluid, the use of fatty acid wetting agents should be minimized so as to not adversely affect the reversibility of the invert emulsion disclosed herein. FAZE-WET®, VERSACOAT®, SUREWET®, VERSAWET®, and VERSAWET® NS are examples of commercially available wetting agents manufactured and distributed by M-I L.L.C. of Houston, Tex. that may be used in the fluids disclosed herein.

In a particular embodiment, the invert emulsion may be of the reversible type, whereby the invert emulsion may be converted form a water-in-oil type emulsion to an oil-in-water type emulsion upon exposure to acid, for example. Such reversible oil-based fluids include those described in U.S. Pat. Nos. 6,806,233 and 6,790,811, for example, which are herein incorporated by reference in their entirety.

Additionally, lime or other alkaline materials may be added to the invert emulsion kill fluid of the present disclosure to maintain a reserve alkalinity. The generally accepted role of the reserve alkalinity is to help maintain the viscosity and stability of the invert emulsion. Absent an alkaline reserve, acidic gases may weaken the stability of the invert emulsion fluids to the point of failure. That is to say the invert emulsion becomes so unstable that the continuous oleaginous phase and the discontinuous non-oleaginous phase irreversibly "flip." Additionally, the reverse alkalinity may also serve to aid in solubilization and/or degradation of the degradable material described above, so that they may hydrolyze and aid in breaking or degradation of the invert emulsion filter cake. In a particular embodiment, lime (or other suitable alkaline materials) may be added such that the non-oleaginous phase may have an equivalent pH of at least 8.3, or greater than 10 or 11 in other embodiments.

Conventional methods may be used to prepare the kill fluids disclosed herein in a manner analogous to those normally used to prepare conventional oil-based fluids. In one embodiment, a desired quantity of oleaginous fluid such as a base oil and a suitable amount of a surfactant are mixed together and the remaining components are added sequentially with continuous mixing. An invert emulsion may also be formed by vigorously agitating, mixing or shearing the oleaginous fluid and the non-oleaginous fluid.

However, in a particular embodiment, the kill fluid may be formulated by mixing together a desired quantity of oleaginous fluid such as a base oil and a suitable amount of a surfactant. The degradable fibers may be added to the non-oleaginous fluid prior to mixing with the oleaginous fluid. Once the oleaginous fluid (with surfactant) and non-oleaginous fluid (with fibers) are added together, lime or other similar alkaline materials may be added to the mixture, followed by the bridging materials. The invert emulsion may be formed by vigorously agitating, mixing or shearing the mixture As mentioned above, the invert emulsion kill fluids of the present disclosure may be spotted or otherwise emplaced in a perforated wellbore in the production zone, i.e., adjacent the perforations. The kill fluid has degradable fibers and bridging materials therein that may effectively bridge and seal off (through formation of a filtercake) the perforations.

Upon degradation/hydrolysis of the degradable fibers, a weak organic acid is released, which may also aid in the dissolution of the bridging materials (depending on the type of bridging material selected). Even if there is minimal dissolution of the bridging materials, the filtercake may be broken (or degraded) due to the degradation of the fibers and fiber mat. As used herein, breaking or degradation of a filtercake encompasses reducing the amount of filter cake or increasing its permeability by dissolving at least a portion of the filter cake. Depending on the fluid type used, the released acid may also reverse the emulsion (from invert to direct) when a reversible fluid is used, as described above. In such an instance, the residual fluid/filtercake may exist as a direct (oil-in-water) emulsion rather than an invert (water-in-oil) emulsion. When the fluid is not reversible, the remaining fluid/filtercake may exist as two phases.

Depending on the downhole environment (frequently 79-149° C.), the degradation fibers may decompose into soluble hydrolysis products, facilitating filtercake removal even without a distinct flushing step. A particular embodiment may include backflow flushing of filtercake residue with a flushing fluid of reservoir fluid produced in situ from the formation after the filtercake is formed. In another embodiment, reservoir fluid may be produced directly from the formation without intermediate recirculation of a flushing fluid in the well to remove filtercake residue.

FIG. 1 shows an embodiment of a casing 10 with perforation tunnels 14 in the producing interval 16, wherein a filtercake 17 has been deposited in the perforation tunnels 14 to inhibit fluid entry into the formation during cleanout of perforation debris and/or until other completion operations have occurred.

EXAMPLES

The following examples are presented to illustrate the preparation and properties of fluid systems, and should not be construed to limit the scope of the invention, unless otherwise expressly indicated in the appended claims. All percentages, concentrations, ratios, parts, etc. are by weight unless otherwise noted or apparent from the context of their use.

Several invert emulsion kill fluids were manufactured and observed.

Fluid 1 contains water (73% v/v), mineral oil (27% v/v), VERSACOAT™ (6-10 ppb (17.1-28.5 kg/m$^3$)), which is a surfactant commercially available from M-I L.L.C. of Houston, Tex., lime (11.4-17.1 kg/m$^3$), 1.13 SG (1.130 kg/m$^3$) CaCl$_2$ (64% v/v), calcium carbonate 2 microns in size (28.5-85.6 kg/m$^3$), calcium carbonate 10 microns in size (28.5-85.6 kg/m$^3$), and degradable fibers (12-18 kg/m$^3$) commercially available from Schlumberger Technology Corporation of Sugar Land, Tex. Fluid 1 contains fibers in a concentration of 18 kg/m$^3$ and Fluid 2 contains the same components as Fluid 1, except that fibers are present in a concentration of 12 kg/m$^3$.

Fluid 3 is a reversible emulsion system that includes water (52% v/v), mineral oil (48% v/v), VG-PLUS (2.9-8.6 kg/m$^3$), an organophilic clay commercially available from M-I L.L.C. of Houston, Tex. as VG-Plus, FAZEMUL® (22.8-34.2 kg/m$^3$), which is a surfactant commercially available from M-I L.L.C. of Houston, Tex., lime (11.4-17.1 kg/m$^3$), 1.28 SG (1.280 kg/m$^3$) CaCl$_2$ (41% v/v), calcium carbonate 2 microns in size (28.5-85.6 kg/m$^3$), calcium carbonate 10 microns in size (28.5-85.6 kg/m$^3$), and degradable fibers (12-18 kg/m$^3$) commercially available from Schlumberger Technology Corporation of Sugar Land, Tex.

Figure 2:
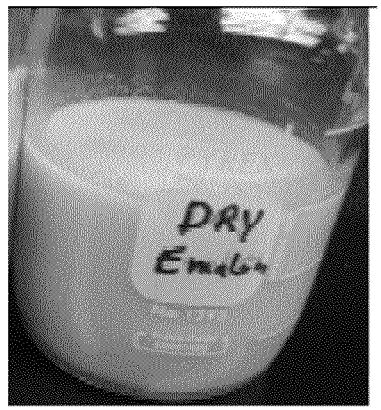
FIG. 2 shows a photograph of an invert emulsion fluid mixed with degradable fibers in accordance with one embodiment.
Figure 3:
FIG. 3 shows a photograph of the mixture shown in FIG. 2 after 100 hours at 93° C.

Fluid 1 was subjected to a fiber dissolution bottle test to determine the timing for complete fiber dissolution (hydrolysis time). The results showed that at 93° C., fibers are dissolved in about 100 hour when exposed to Fluid 1. After 100 hours at 93° C., as illustrated in FIG. 2 (before) and FIG. 3 (after), the fibers dissolve in the system and layers of oil, residual calcium carbonate, and calcium lactate may form.

Fluid rheology was determined on a Fann 35 Viscometer available from Fann Instrument Company, and fluid loss properties were measured using a high pressure, high temperature fluid loss test performed at 3447 kPa and 79° C. Table 1 compares the rheology properties of the three fluids including plastic viscosity (PV), yield point (YP), and electrical stability (ES).

TABLE 1

| Rheology (RPM) | 1 | 2 | 3 (Fazepro) |
| --- | --- | --- | --- |
| 600 | 101 | 123 | 68 |
| 300 | 65 | 80 | 43 |
| 200 | 51 | 62 | 33 |
| 100 | 34 | 39 | 22 |
| 6 | 8 | 7 | 9 |
| 3 | 7 | 6 | 8 |
| Plastic Viscosity (Pa · s) | 0.036 | 0.043 | 0.025 |
| Yield Point (Pa) | 13.86 | 17.68 | 8.6 |
| Electrical Stability (volts) | 58 | 36 | 433 |

TABLE 2

| Fluid Loss (mls) | Fluid 1 | | Fluid 3 | |
| --- | --- | --- | --- | --- |
| | with fibers | Without Fibers | with fibers | Without Fibers |
| spurt | 0.5 | 1.5 | 4 | 2.5 |
| 1 min | 2 | 2.5 | 7 | 5.4 |
| 4 min | 2.6 | 2.8 | 9 | 6.8 |
| 9 min | 2.8 | 3 | 10.8 | 8.6 |
| 16 min | 2.9 | 3.6 | 12 | 9.7 |
| 25 min | 3 | 3.9 | 13.2 | 10.2 |
| 30 min | 3.6 | 4.2 | 13.5 | 10.6 |
| 36 min | 3.8 | 4.4 | 14.4 | 10.8 |
| 1 hr | 4.4 | 5 | 15.5 | 13.2 |

Figure 4:
FIG. 4 shows a photograph of an invert emulsion fluid mixed with degradable fibers on an Aloxite disk in accordance with one embodiment.
Figure 5:
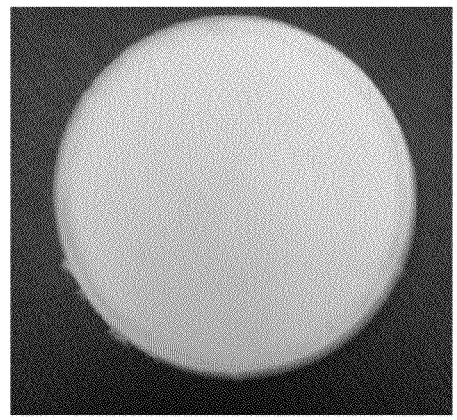
FIG. 5 shows a photograph of the mixture shown in FIG. 4 after 168 hours at 79° C.

The high pressure high temperature tests were conducted in a fluid loss cell using 3 micron Aloxite disks. As shown in FIG. 4 (before) and FIG. 5 (after), after 168 hrs at 79° C., the fibers are decomposed and reacted with most of the carbonates in the sample, leaving the disk without any residual fibers or carbonate bridging particles.

Embodiments of the present disclosure may provide at least one of the following advantages. An invert emulsion fluid having degradable fiber-based materials and bridging materials may serve as a kill fluid (temporary well treatment) in a cased, perforated wellbore to temporarily minimize the ingress and egress of fluids through the perforations while completions operations may be performed. Upon completion of the completion operations, the kill fluid may self-destruct through the degradation of the degradable fiber based materials in water and high temperatures, reducing any solids from being left behind. The hydrolysis of the fibers may also contribute (to some extent) to the dissolution of the bridging materials, as well as the reversal of the emulsion when a reversible emulsion is used.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of treating a subterranean formation, comprising:
    pumping into a cased, perforated wellbore that intersects the formation an invert emulsion kill fluid, the invert emulsion kill fluid comprising:
        an oleaginous continuous phase;
        a non-oleaginous discontinuous phase;
        an emulsifier;
        at least one degradable material; and
        at least one bridging material;
    contacting the formation with the kill fluid;
    killing the well, and
    allowing the degradable material to at least partially degrade.

2. The method of claim 1, wherein the degradable material comprises at least one of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, or mixtures thereof.

3. The method of claim 1, wherein the degradable material is hydrolyzed over a period of time.

4. The method of claim 3, wherein the degradable material hydrolyzes to release an organic acid.

5. The method of claim 4, wherein the organic acid reverses the kill fluid such that the oleaginous fluid is the discontinuous phase and the non-oleaginous fluid is the continuous phase.

6. The method of claim 1, wherein the kill fluid further comprises lime.

7. The method of claim 1, wherein the bridging materials comprise at least one of calcium carbonate, dolomite, barium sulfate, ilmenite, hematite, olivine, siderite, galena, manganese oxide, iron oxides, strontium sulfate, celluloses, micas, proppant materials, or mixtures thereof.

8. The method of claim 1, wherein the oleaginous phase comprises from about 30% to 99% by volume of the kill fluid.

9. The method of claim 1, wherein the oleaginous phase is selected from diesel oil, mineral oil, synthetic oil, ester oils, glycerides of fatty acids, aliphatic esters, aliphatic ethers, aliphatic acetals, or combinations thereof.

10. The method of claim 1, wherein the non-oleaginous phase comprises from about 1% to about 70% by volume of the kill fluid.

11. The method of claim 1, wherein the non-oleaginous phase is selected from fresh water, sea water, brine, aqueous solutions containing water soluble organic salts, water soluble alcohols or water soluble glycols, or combinations thereof.

12. The method of claim 1, wherein the emulsifier comprises at least one of fatty acids, soaps of fatty acids, amidoamines, polyamides, polyamines, oleate esters, imidazoline derivatives or alcohol derivatives or combinations or derivatives thereof.

13. A method, comprising:
    forming an invert emulsion kill fluid, the invert emulsion kill fluid comprising:
        an oleaginous continuous phase;
        a non-oleaginous discontinuous phase;
        an emulsifier;
        at least one degradable material; and
        at least one bridging material;
    pumping the kill fluid into a cased, perforated wellbore that intersects a subterranean formation;
    forming a filtercake;
    killing the well; and
    breaking the filtercake by allowing the degradable material to degrade.

14. The method of claim 13, wherein the degradable material comprises at least one of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, or mixtures thereof.

15. The method of claim 13, wherein the degradable material is hydrolyzed over a period of time.

16. The method of claim 15, wherein the degradable material hydrolyzes to release an organic acid.

17. The method of claim 16, wherein the organic acid reverses the kill fluid such that the oleaginous phase is the discontinuous phase and the non-oleaginous phase is the continuous phase.

18. The method of claim 13, wherein the kill fluid further comprises lime.

19. The method of claim 13, wherein the bridging materials comprise at least one of calcium carbonate, dolomite, barium sulfate, ilmenite, hematite, olivine, siderite, galena, manganese oxide, iron oxides, strontium sulfate, celluloses, micas, proppant materials, or mixtures thereof.

20. The method of claim 13, wherein the oleaginous phase comprises from about 30% to 99% by volume of the kill fluid.

21. The method of claim 13, wherein the oleaginous phase is selected from diesel oil, mineral oil, synthetic oil, ester oils, glycerides of fatty acids, aliphatic esters, aliphatic ethers, aliphatic acetals, or combinations thereof.

22. The method of claim 13, wherein the non-oleaginous phase comprises from about 1% to about 70% by volume of the kill fluid.

23. The method of claim 13, wherein the non-oleaginous phase is selected from fresh water, sea water, brine, aqueous solutions containing water soluble organic salts, water soluble alcohols or water soluble glycols or combinations thereof.

24. The method of claim 13, wherein the emulsifier comprises at least one of fatty acids, soaps of fatty acids, amidoamines, polyamides, polyamines, oleate esters, imidazoline derivatives or alcohol derivatives or combinations or derivatives thereof.

25. A method, comprising:
  forming an invert emulsion kill fluid comprising:
    an oleaginous continuous phase;
    a non-oleaginous discontinuous phase;
    an emulsifier;
    at least one degradable material; and
    at least one bridging material;
    emplacing the kill fluid into a cased, perforated wellbore;
  forming a filtercake;
  killing the well; and
  breaking the filter cake,
  wherein hydrolysis of the degradable material breaks the filtercake.

* * * * *